United States Patent

[11] 3,633,948

[72] Inventor Ronald E. Dickey
 913 June Street, Fremont, Ohio 43420
[21] Appl. No. 1,394
[22] Filed Jan. 8, 1970
[45] Patented Jan. 11, 1972

[54] ABRASION-RESISTANT PIPE COUPLING
 8 Claims, 5 Drawing Figs.
[52] U.S. Cl. .................................................. 285/312, 285/174
[51] Int. Cl. ..................................................... F16l 37/00
[50] Field of Search ........................................... 285/320, 174, 312, 423

[56] References Cited
 UNITED STATES PATENTS
2,478,586  8/1949  Krapp .......................... 285/312

| 2,888,277 | 5/1959 | Melsom | 285/423 X |
| 3,103,887 | 9/1963 | Nepple | 285/423 X |
| 3,124,374 | 3/1964 | Krapp | 285/312 X |
| 3,224,795 | 12/1965 | Conley | 285/423 X |
| 3,334,860 | 8/1967 | Bolton, Jr. | 285/423 X |

Primary Examiner—Andrew V. Kundrat
Attorney—Wilson & Fraser

ABSTRACT: An abrasion-resistant pipe-coupling element formed of a plastic material having inherent self-lubricating properties with an abrasion-resistant lining. The coupling construction is particularly useful in cam-locking couplings employed at the discharge conduit of bulk carriers of the type used for transporting abrasive materials such as cement, limestone, and the like.

INVENTOR.
RONALD E. DICKEY
BY Wilson & Fraser
ATTORNEYS 3,633,948

ABRASION-RESISTANT PIPE COUPLING

BACKGROUND OF THE INVENTION

1. Field of the Invention

The invention relates to quick-connect couplings of the type employed at the discharge outlet of transports for bulk materials, such as cement, limestone, and the like.

2. Description of the Prior Art

Quick-disconnect couplings for discharge outlets of transports used to transport highly abrasive and/or corrosive materials have been formed of brass and aluminum alloys. For reasons of economy, materials such as stainless steel, which could better withstand the abrasiveness and corrosiveness of such material, could not be employed. It has been found that the materials so used have oxidized or corroded to such an extent that it has become nearly impossible to remove them for replacement. Further, it has been found that in the event such couplings were dropped, the couplings were caused to become out of round, oftentimes to such an extent that they were rendered inoperative. Also, in cam-locking coupling structures, the cam arms were hard to close and resulted in excessive wear. Since brass and aluminum alloys are comparatively soft, the mating faces of such couplings were easily dented, causing a loss of desired sealing effect.

SUMMARY OF THE INVENTION

It is a primary object of the invention to provide a pipe coupling employing a plastic material main body section having an abrasion- or corrosion-resistant lining therefor.

Another object of the invention is to provide a plastic quick-connect construction for use in connection with a cam-locking connection wherein the coupling has a peripherally formed depression for the reception of the cam-locking means.

Another object of the invention is to provide a plastic quick-connect construction having an abrasion-resistant hollow metal core about which the plastic is formed to confirm to the outer configuration thereof, thereby maintaining the desired dimensions.

BRIEF DESCRIPTION OF THE DRAWINGS

The above and other objects and advantages of the invention will become readily apparent to those skilled in the art from reading the following detailed description of preferred embodiments of the invention, when considered in the light of the accompanying drawings, in which.

DESCRIPTION OF PREFERRED EMBODIMENTS

Figure 1:
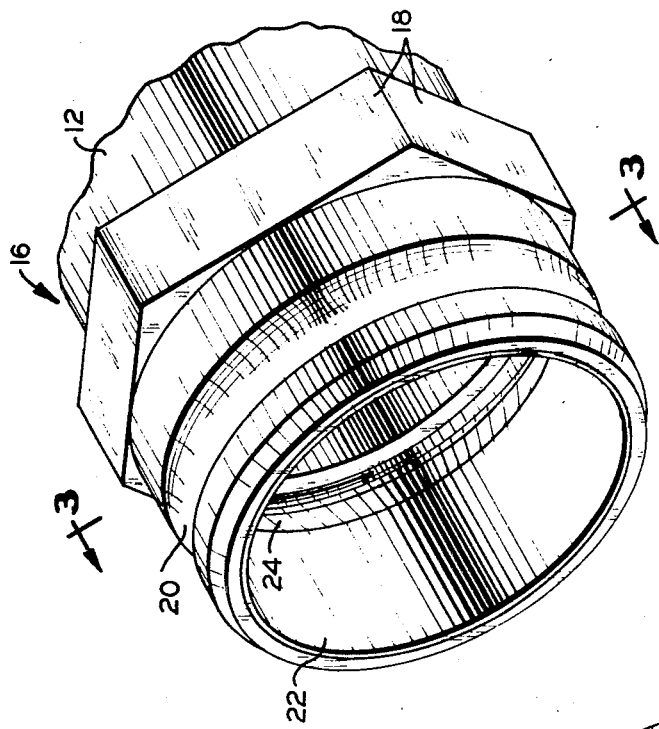
FIG. 1 is an exploded fragmentary perspective view of a cam-locking pipe coupling employing the features of the invention.
Figure 1:
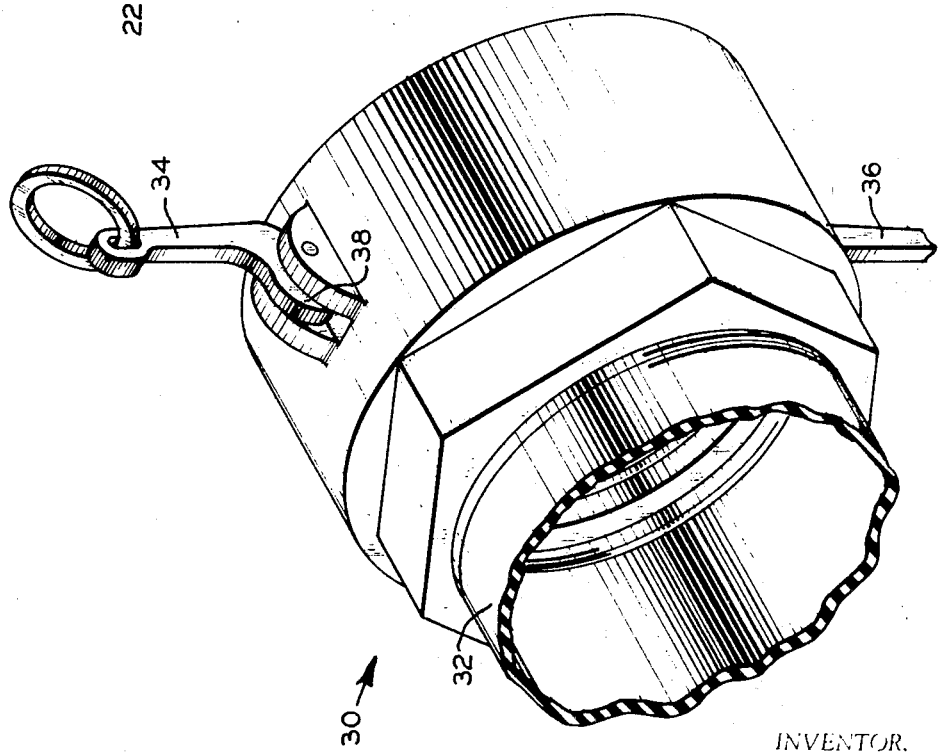
Figure 2:
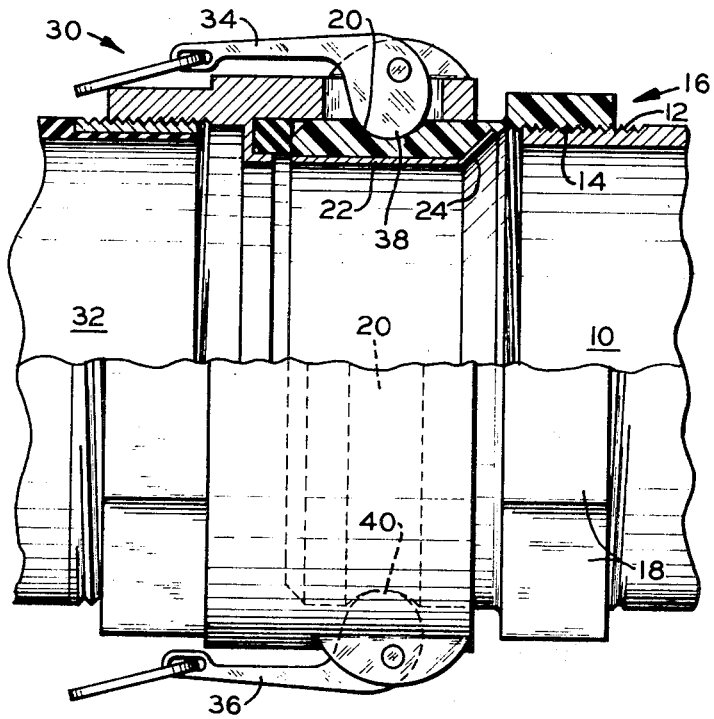
FIG. 2 is a side elevational view partially in section of the coupling illustrated in FIG. 1 in assembled form.
Figure 3:
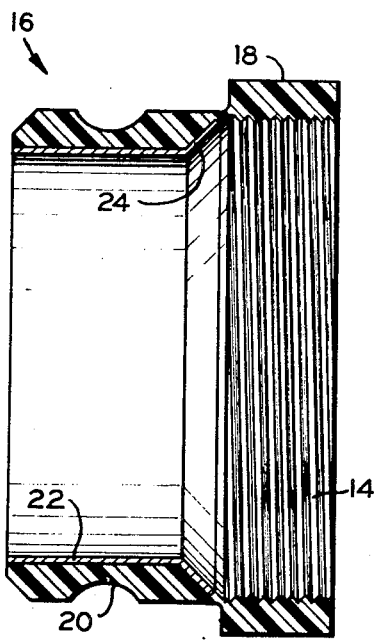
FIG. 3 is a sectional view of the pipe-coupling adapter element of the invention taken along line 3—3 of FIG. 1.

Referring to FIGS. 1, 2, and 3, there is illustrated a pipe coupling of the type which may be employed at the discharge conduit of a bulk-type transport vehicle, for example. The outlet conduit 10 of the transport vehicle is provided with an externally threaded portion 12 to which is attached an internally threaded portion 14 of a cam lock pipe-coupling adapter element 16, adapted to threadably engage with the externally threaded portion 12 of the outlet conduit 10. The outer peripheral surface of the portion 14 in the region of the adapter element 16 is formed with spaced flat sections 18 to engage a wrench or other tool to engage or disengage the element 16 and the outlet conduit 10. The internal surface of the adapter element 16 is further provided with a reduced-diameter section 20, having a cylindrical metal insert 22 disposed therein.

In a typical embodiment of the invention, the main body portion of the coupling adapter element 16 is formed of fiber-glass-reinforced nylon, such as the type manufactured and sold by Fiberfil Division of Rexall Chemical Company, Evansville, Ind., under the trademark "Nyglas." The material has tensile strength of up to 24,000 p.s.i. Without the addition of any supplementary lubricants, such as molybdenum disulfide, the material is inherently high in lubricity, which is extremely advantageous from several aspects, as will become apparent hereinafter.

The pipe-coupling adapter element 16 is adopted to be quickly coupled and decoupled with a cam-locking coupler element 30, which is connected to the inlet end of a flexible outlet hose 32. The coupler 30 has a pair of diametrically opposed arms 34 and 36, which are pivotally connected to the outer surface thereof in such a fashion that the innermost cam ends 38 and 40, respectively, are adapted to seat in the peripherally formed reduced-diameter portion 20 of the adapter element 16 when the coupler element 30 is in a position to be coupled as illustrated in FIG. 2. It will be observed that FIG. 2 shows the coupler 30 in a coupled or connected relation with the adapter 16, wherein the arms 34 and 36 have been pivoted to a position wherein their respective cam ends 38 and 40 are in a seated position in the portion 20 of the adapter 16, thereby positively locking the coupler 30 and the adapter 16. Due to the inherent lubricity of the material out of which the adapter 16 is formed, the arms 34 and 36 may be easily and readily pivoted into a locked position by a single operator. Depending on the type of fluid material being conveyed through the thus-formed conduit, a gasket may be employed to provide a further seal between the outer end of the adapter 16 and the adjacent inner portion of the coupler 30.

Since the material used for fabricating the main body of the adapter 16 has inherent lubricity, it can be readily unscrewed from the outlet conduit 10. This may be required for a multitude of reasons, amongst which includes the replacement of the adapter 16. Since the material of the adapter 16 is inert to the corrosive effects of the ambient environment and the materials being conveyed therethrough, the possibility of a buildup of corrosion between the threads of the portions 12 and 14 is extremely remote, thereby facilitating disconnection therebetween, if required.

It will be observed that the innermost end of the metal insert 22 is formed to have a flared end 24 facilitating the desired coupling between the associated adapter 16 and the outlet conduit 10 to primarily effect the desired sealing relationship and to militate against the abrasive contact between the transient fluid material and the plastic material of the adapter. The insert 22 is preferably formed of a steel having a high carbon content to render the same resistant to abrasive and corrosive effect of the transient fluids.

In fabricating the adapter 16, the metal insert 22 is disposed in a suitable die mold arrangement and thereafter the plastic material containing the fiber glass reinforcing medium is injected in a fluid state thereinto to completely surround the outer peripheral wall surface of the insert. During the curing of the plastic material, the material in effect shrinks slightly and assumes the general cylindrical shape of the insert. It is believed to be important that the configuration of the outer peripheral wall of the adapter 16 is cylindrical and generally annular or circular in cross section so that the finished element will be readily and easily received within the cylindrical interior of the coupler element 30.

Figure 4:
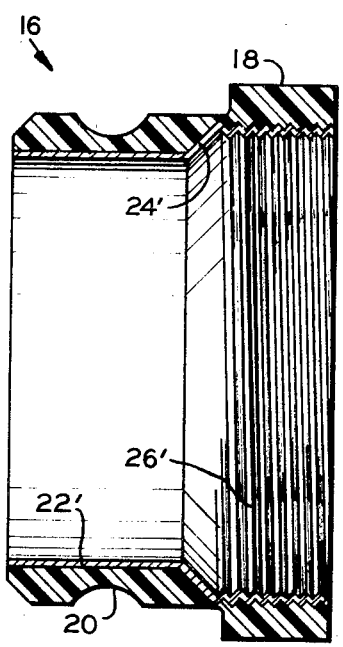
FIG. 4 is a sectional view of a modified form of the invention illustrated in FIGS. 1, 2, and 3.

FIG. 4 illustrates a modified form of the invention wherein the metal insert 22' is provided with a flared inner end section 24' and a continuing threaded section 26'. The threaded section 26' may be employed in certain applications where the assembly is to be used with fluids which may react with or have a corrosive effect upon the plastic material making up the main body of the associated adapter.

Figure 5:
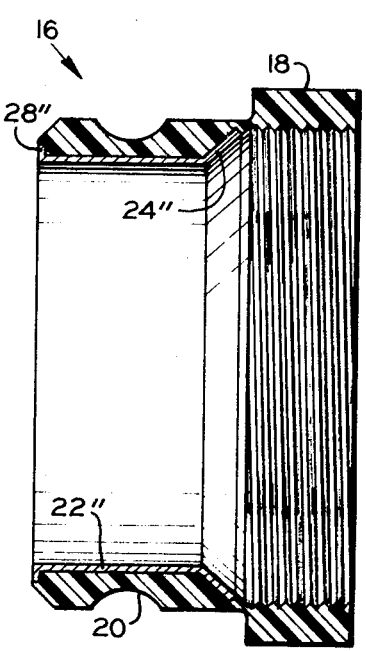
FIG. 5 is a sectional view of another modified form of the invention.

FIG. 5 illustrates another modified form of the invention wherein the metal insert 22'' is provided with a flared inner section 24'' and an oppositely disposed flared end 28'', which forms a protection for the end of the adapter 16 which actually physically contacts the inner portion of the associated coupler.

While the major objectives of the invention are achieved by the above-described structures, the adapter 16 may also be initially formed in any of the well-known molding techniques and then have the inner peripheral wall surface coated with a polyurethane plastic material which resultant structure would be useful for conveying dry mixes; or coated with a Teflon plastic material for conveying highly corrosive liquids such as acids, for example.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

I claim:

1. A pipe coupling for a hollow cylindrical cam-locking coupler element, comprising:
   a hollow cylindrical adapter element for coupling to the coupler element, said adapter element formed of a plastics material, the outer peripheral surface of one end portion of said adapter element having cam-receiving means formed therein, the outer peripheral surface of the other end portion of said adapter element having surfaces formed thereon adapted for the engagement of a tool for rotationally moving said adapted element, the inner peripheral surface of said one end of said adapter element being relatively smooth, the inner peripheral surface of said other end of said adapter element having internal threads integrally formed thereon, a shoulder formed on the inner peripheral surface of said adapter element intermediate the smooth inner peripheral surface of said one end and the internal threads of said other end; and
   an abrasion-resistant sleeve in juxtaposed relation with the smooth inner peripheral wall surface of said one end of said adapter element, said sleeve having a flared end, the outer surface of said flared end disposed adjacent to the shoulder on the inner peripheral surface of said adapter element.

2. The invention defined in claim 1 wherein said plastic material has inherent lubricity.

3. The invention defined in claim 1 wherein said plastic material is nylon.

4. The invention defined in claim 1 wherein said plastic material includes fiber glass reinforcement.

5. The invention defined in claim 1 wherein said sleeve is formed of steel.

6. The invention defined in claim 1 wherein said cam-receiving means is in the form of an annular groove.

7. The invention defined in claim 1 wherein said sleeve is polyurethane.

8. The invention defined in claim 1 wherein said sleeve is Teflon.

* * * * *